(12) United States Patent
Fitzmaurice et al.

(10) Patent No.: US 7,814,439 B2
(45) Date of Patent: Oct. 12, 2010

(54) PAN-ZOOM TOOL

(75) Inventors: George W. Fitzmaurice, Ontario (CA);
Robert J. Pieke, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 871 days.

(21) Appl. No.: 10/684,579

(22) Filed: Oct. 15, 2003

(65) Prior Publication Data
US 2004/0141010 A1 Jul. 22, 2004

Related U.S. Application Data

(60) Provisional application No. 60/419,144, filed on Oct. 18, 2002.

(51) Int. Cl.
*G06F 3/048* (2006.01)
(52) U.S. Cl. .................. 715/856; 715/808; 715/810
(58) Field of Classification Search ................ 715/856, 715/711, 808, 810, 840, 864, 708, 721, 768, 715/798, 714, 845; 345/157
See application file for complete search history.

(56) References Cited

U.S. PATENT DOCUMENTS

| 4,931,783 | A |   | 6/1990  | Atkinson       |         |
|-----------|---|---|---------|----------------|---------|
| 5,276,795 | A | * | 1/1994  | Hoeber et al.  | 715/813 |
| 5,581,670 | A |   | 12/1996 | Bier et al.    |         |
| 5,627,960 | A |   | 5/1997  | Clifford et al.|         |
| 5,634,064 | A | * | 5/1997  | Warnock et al. | 715/513 |
| 5,638,523 | A | * | 6/1997  | Mullet et al.  | 715/855 |
| 5,666,499 | A |   | 9/1997  | Baudel et al.  |         |
| 5,689,667 | A |   | 11/1997 | Kurtenbach     |         |
| 5,760,773 | A |   | 6/1998  | Berman et al.  |         |

(Continued)

OTHER PUBLICATIONS

Adobe Photoshop 5, pp. 1-2, published 1998.*

(Continued)

*Primary Examiner*—Steven B Theriault
*Assistant Examiner*—Tuyetlien T Tran
(74) *Attorney, Agent, or Firm*—Staas & Halsey, LLP

(57) ABSTRACT

The present invention is a system that provides a user with a pan-zoom tool that is controlled by a limited input device, such as a pen or stylus, of a pen based computer. The pan-zoom tool is a semitransparent, bull's eye type tracking menu that tracks the position of the pen. A pen-cursor or tracking symbol that corresponds to the location of the pen is allowed to move about within a pan-zoom tool graphic. The tool is moved when the location of the pen encounters a tracking boundary of the tool at an exterior edge of the menu. While moving within the pen-mouse the pen can select pan and zoom functions located in concentric rings of the tool graphic as the active function of the tool. Once one of the pan or zoom functions is activated motion of the pen on the surface of the display is interpreted as corresponding pan or zoom control commands, the tool is becomes transparent and the tracking symbol is replaced by a corresponding pan or zoom icon. The concentric ring menu can have additional button type controls, for functions in addition to pan and zoom, located on a boundary between the rings forming access lanes for movement of the tracking menu during function selection. The function or control of the center ring can be the most recently selected function.

34 Claims, 14 Drawing Sheets

U.S. PATENT DOCUMENTS

| | | | |
|---|---|---|---|
| 5,798,752 | A | 8/1998 | Buxton et al. |
| 6,037,937 | A * | 3/2000 | Beaton et al. ............... 715/764 |
| 6,097,387 | A * | 8/2000 | Sciammarella et al. ...... 715/784 |
| 6,118,427 | A | 9/2000 | Buxton et al. |
| 6,246,411 | B1 * | 6/2001 | Strauss ....................... 715/863 |
| 6,262,719 | B1 | 7/2001 | Bi et al. |
| 6,369,837 | B1 * | 4/2002 | Schirmer ................... 715/764 |
| 6,549,219 | B2 * | 4/2003 | Selker ........................ 715/834 |
| 6,865,719 | B1 * | 3/2005 | Nicholas, III .............. 715/856 |
| 6,918,091 | B2 * | 7/2005 | Leavitt et al. ............... 715/765 |
| 6,938,221 | B2 * | 8/2005 | Nguyen ...................... 715/863 |
| 7,058,902 | B2 | 6/2006 | Iwema et al. |
| 2001/0009428 | A1 * | 7/2001 | Dow et al. .................. 345/854 |
| 2002/0085037 | A1 * | 7/2002 | Leavitt et al. ............... 345/765 |
| 2002/0101458 | A1 * | 8/2002 | SanGiovanni .............. 345/863 |
| 2002/0122072 | A1 * | 9/2002 | Selker ........................ 345/834 |
| 2004/0021647 | A1 * | 2/2004 | Iwema et al. ............... 345/179 |

OTHER PUBLICATIONS

Accot, J. Zhai, S. (2002), "More than dotting the I's—foundations for crossing-based interfaces", Proceedings of ACM CHI 2002, pp. 73-80.

Bier, E. A., Stone, M.C., Fishkin, K., Buxton, W., Baudel, T., (1994), "A Taxonomy of See Through Tools", Proceedings of the ACM CHI 1994, pp. 358-364.

Buxton, W., (1990), "A Three-State Model of Graphical Input", In D., Diaper et al. (Eds), Human-Computer Interaction—INTERACT '90., Amsterdam: Elsevier Science Publishers B.V., (North-Holland), pp. 449-456.

Buxton, W., Fitzmaurice, G., Balakrishnan, R., and Kurtenbach, G. (200), "From Traditional to Electronic Large Displays in Automotive Design", IEEE Computer Graphics and Applications, 20(4), pp. 68-75.

Callahan, J., Hopkins, D., Weiser, M. & Shneiderman, B. (1988), "An Empirical Comparison of Pie vs. Linear Menus", Proceedings of CHI '88, pp. 95-100.

Elrod, S., Bruce, R., Gold, R., Goldberg, D., Halasz, EG., Janssen, Jr., W. C., Lee, D., McCall, K., Pedersen, E.R., Pier, K.A., Tang., and Welch, B., (1992), "Liveboard: A Large Interactive Display Supporting Group Meetings, Presentations, and Remote Collaboration", Proceedings of ACH CHI 1992, pp. 599-607.

Guimbretiere, F., Stone, M. & Winograd, T., (2001), "Fluid Interaction with High-Resolution Wall-size Displays", Proceedings of ACM UIST 2001, pp. 21, 30.

Guimbretiere, F., and Winograd, T., (2000), "FlowMenu: Combining Command, Text, and Data Entry", Proceedings of ACM UIST 2000, pp. 213-216.

Harrison, B., Kurtenbach, G., Vincente, K., (1995), "An Experiment Evaluation of Transparent User Interface Tools and Information Content", Proceedings of ACM UIST, 1995, pp. 81-90.

Harrision, B., Fishkin, K., Gujar A., Mochon, C., Want, R. (1998), "Squeeze me, hold me, tilt me! An Exploration of Manipulative User Interfaces", Proceedings of ACM CHI 1998, pp. 17-24.

Kramer, A., (1994), "Translucent Patches: Dissolving Windows", Proceedings of ACM UIST 1994, pp. 121-130.

Kurtenbach, G. & Buxton, W., (1993), "The limits of expert performance using hierarchical marking menus", Proceedings of the ACM CHI 1993, pp. 482-487.

Kurtenbach, G., Fitzmaurice, G., Baudel, T., Buxton, B., (1997), "The Design of a GUI Paradigm based on Tablets, Two-Hands, and Transparency", Proceedings of ACH CHI 1997, pp. 35-42.

Kurtenbach, G., (1993), The Design and Evaluation of Marking Menus, Ph.D., thesis, University of Toronto, Dept. of Computer Science.

Pook, S., Lecolinet, E., Vaysseix, G., and Barillot,, E. (2000), "Control Menus: Execution and Control in a Single Interactor", Proceedings of ACH CHI 2000 Extended Abstracts, pp. 263-264.

Rubio, J. M. and Janacek, P. (2002), "Floating Pie Menus: Enhancing the functionality of Contextual Tools", Proceedings of ACM UIST 2002 Conference Companion, pp. 39-40.

Venolia, D. and Neiberg, F. (1994), "T-Cube: A Fast, Self-Disclosing Pen-Based Alphabet", Proceedings of ACH CHI 1994, pp. 265-270.

Hopkins, D. (1991), "The Design and Implementation of Pie Menus", Dr. Dobbs Journal, 16(12), pp. 16-26.

Bederson, B.B. and Hollan, J. D. (1994), "Pad++: A Zooming Graphical Interface for Exploring Alternative Interface Physics", Proceedings of ACM UIST 1994, pp. 17-26.

Perlin, K. and Fox, D. (1993), "Pad: An Alternative Approach to the Computer Interface", Proceedings of ACM SIGGRAPH 1993, pp. 57-64.

MacKenzie, I.S. & Buxton, W. (1994), "Prediction of Pointing and Dragging Times in Graphical User Interfaces Interacting With Computer", 6(4), pp. 213-227.

Myers, B. & Buxton, W. (1986), "Creating Highly-Interactive and Graphical User Interfaces by Demonstration", Computer Graphics 20(3), Proceedings of SIGGRAPH '18, pp. 249-258.

Fitzmaurice et al., "Tracking Menus", Alias|Wavefront, pp. 1-10.

Fitzmaurice et al., "Tracking Menus", Proceedings from ACM CHI 2003, vol. 5, Issue 2, pp. 71-80.

* cited by examiner

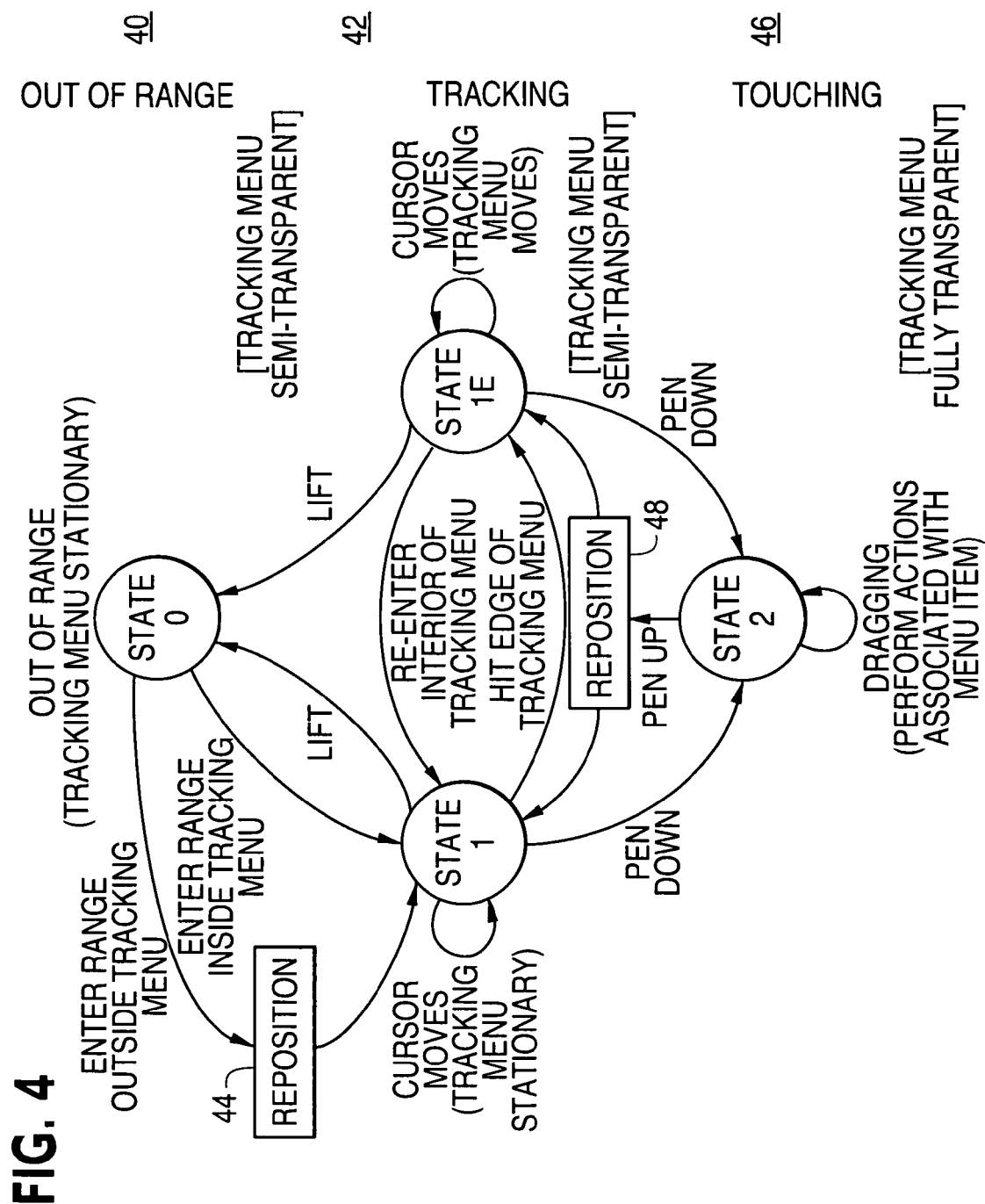

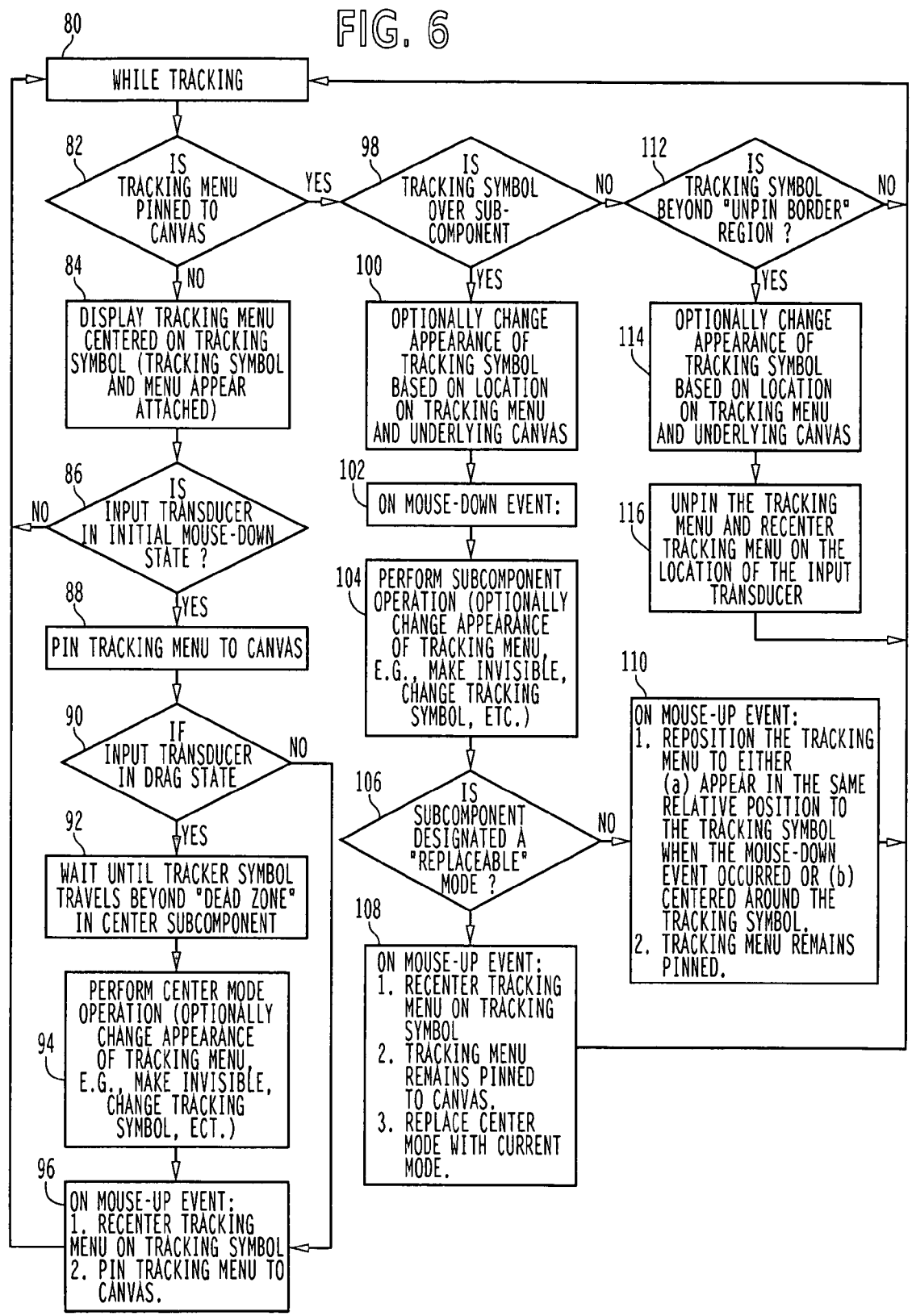

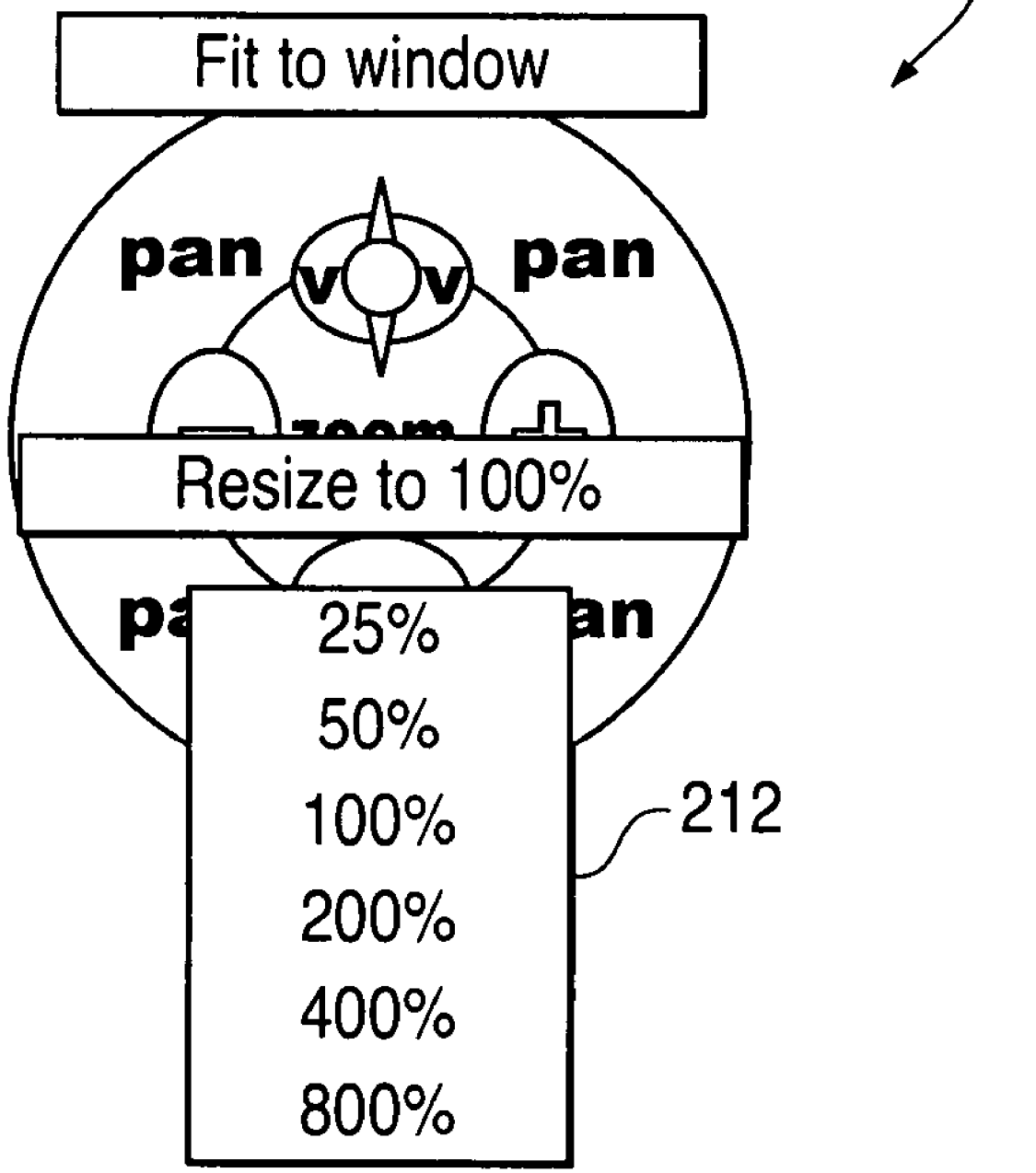

PAN-ZOOM TOOL

CROSS-REFERENCE TO RELATED APPLICATION(S)

This application is related to and claims priority to U.S. provisional application entitled Tracking Menu System (1252.1082P) having Ser. No. 60/419,144, by Fitzmaurice et al, filed Oct. 18, 2002, this application is also related to U.S. application entitled Tracking Menus, System And Method having Ser. No. 10/684,580, by Fitzmaurice et al, filed concurrently herewith and to U.S. application entitled A Pen-Mouse System having Ser. No. 10/684,580, by Fitzmaurice et al, filed concurrently herewith, all of which are incorporated by reference herein.

BACKGROUND OF THE INVENTION

1. Field of the Invention

The present invention is directed to a pan-zoom tool tracking menu providing selectable pan and zoom functions and tracking a position of a pen type input transducer and, more particularly, to a bulls eye type target shaped tool having the pan and zoom controls in distinct rings of the target.

2. Description of the Related Art

Stylus or pen-based computers, such as tablet (personal computers) PCs and personal digital assistants (PDAs) are becoming a popular type of computing device. These devices operate somewhat differently than the typical mouse-based computer systems. In the pen-based devices the user uses a stylus or pen to select and activate items, such as menu controls/buttons, as well as to perform graphic functions, such as drawing. In performing these different operations it is often the case that the user must move the pen to a menu to select a function and then return to the display area to perform the function. This is particularly true of pan and zoom functions that need to be performed and often swapped during graphics processing. These tool palette round trips are time consuming.

What is needed is a system that will avoid tool palette round trips for such limited input device systems when pan and zoom operations are being performed.

SUMMARY OF THE INVENTION

It is an aspect of the present invention to provide a pan-zoom tool that provided tracking menu features.

It is another aspect of the present invention to provide a bull's-eye shaped tool with a most frequently used function, such as the pan, function in an outer ring.

It is also an aspect of the present invention to provide behavior of the tracking menu where the tracking menu disappears when either the pan or zoom feature is engaged.

It is an additional aspect of the present invention that, when a keyboard or alternate input device is available, the pan-zoom tracking menu can be invoked by pressing a key on the keyboard, for example, the space bar.

The above aspects can be attained by a system that provides a user with a pan-zoom tool that is controlled by a limited input channel input device, such as a pen or stylus, of a pen based computer. The pan-zoom tool is a tracking menu that tracks the position of the pen. A pen-cursor or tracking symbol that corresponds to the location of the pen is allowed to move about within a pan-zoom tool graphic. The tool is moved when the location of the pen encounters a tracking boundary of the tool. While moving within the pen-mouse the pen can select pan and zoom functions as the active function of the tool. Once one of the pan or zoom functions is activated motion of the pen on the surface of the display is interpreted as corresponding pan or zoom control commands.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 depicts a state diagram of tracking menu operations.

FIG. 6 illustrates tracking operation with pinning

FIG. 12 shows a marking menu allowing a hierarchy of controls.

DETAILED DESCRIPTION OF THE PREFERRED EMBODIMENTS

Figure 1A:
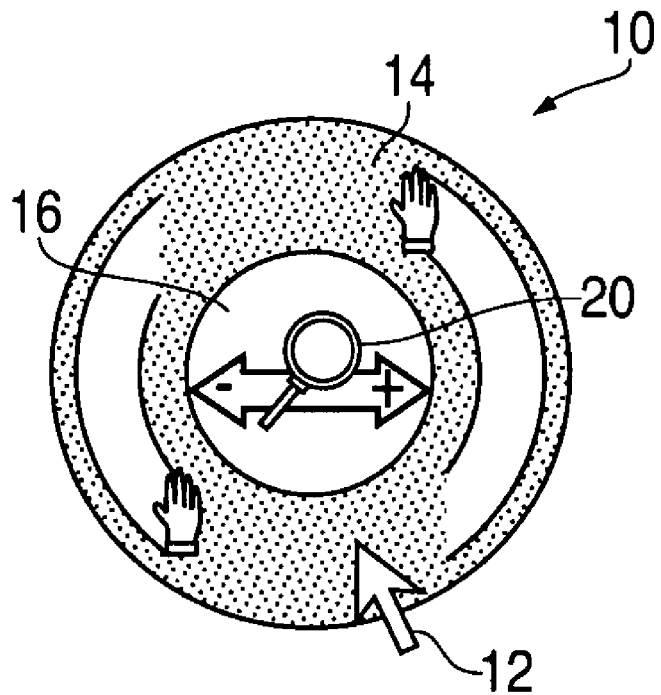
FIGS. 1a and 1b depict a first embodiment of the pan-zoom, tracking menu tool of the present invention.
Figure 1B:
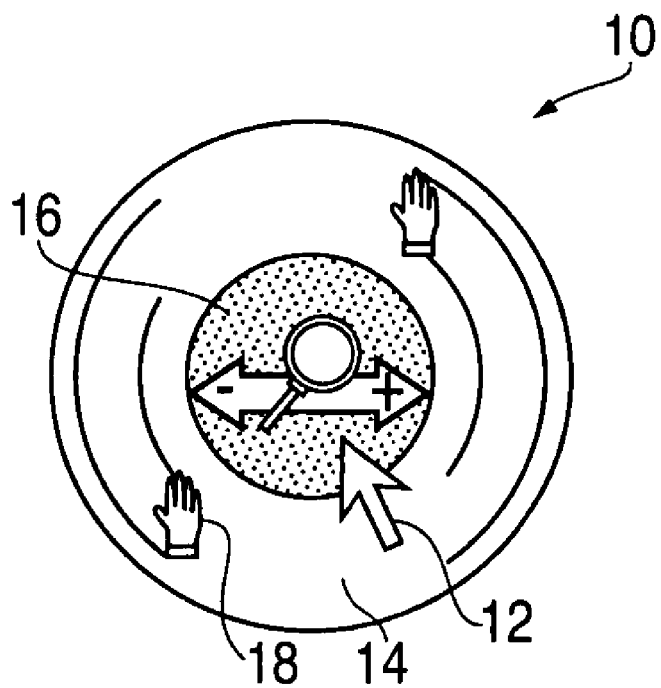

The present invention is directed to a user interface, particularly, a graphical user interface (GUI) in the form of a tracking menu, pan-zoom tool 10, as depicted in FIGS. 1a and 1b and is particularly suitable for a pen or stylus based computer system, such as a tablet PC. FIG. 1a shows a tracking symbol or cursor 12 hovering over a pan region 14 (pan is "highlighted") and FIG. 1b shows the cursor 12 hovering over a zoom region 16 (zoom is "highlighted"). As depicted, the tool includes two semi-transparent regions 14 and 16 where panning is placed in an outer ring and zooming is placed in an inner region. The outer ring 14 can include a hand icon 18 conventionally representative of a pan operation and the inner region 16 can include a magnifying glass icon 19 representative of a zoom operation.

When the outer or pan region 14 is activated, movement of the pen (and cursor 12) in a down condition conventionally activates a pan operation where the underlying image is moved in correspondence to the movement of the pen. That is, as the pen is moved to the right the image displayed on the table PC display moves to the right.

When the inner or zoom region 16 is activated the movement of the pen (and cursor 12) in a down condition causes the image to be conventionally zoomed in (enlarged) or zoomed out (shrunk). The zooming can be controlled based on a preferred zoom control axis or can be based on a zoom control axis chosen by the user. For example, the horizontal or right/left axis of the display can be set to control the zoom, as depicted in FIGS. 1a and 1b, such that right pen movement causes a zoom-in (indicated by the "+" sign and the right directional arrow of FIG. 1b) and left pen movement causes a zoom-out (indicated by the "−" sign and the left directional arrow of FIG. 1b). This predetermined zoom control axis can be another axis, such as the up/down or vertical axis where movement of the pen down causes a zoom-in and movement of the pen down causes a zoom-out. When the user chooses the zoom axis, as will be discussed in more detail later herein, the first movement by the user of the pen on the display after zoom is activated designates the zoom control axis and movement in that direction causes a zoom-in and movement in the opposite direction causes a zoom-out.

As noted above, the pan-zoom tool 10 of the present invention is a tracking menu. A tracking menu is a graphical user interface that is controlled by either a pen or mouse having an associated pen or mouse cursor where the cursor can be invisible. A tracking menu is invoked and dismissed in the same manner as a traditional modal tool by clicking on a tool palette or menu item. Like traditional menus, a tracking menu includes a cluster of graphical buttons or controls; in this case the pan region 14 is a pan button or control and the zoom region 16 is a zoom button or control. The pen cursor 12 can be moved within the menu to select and interact with items, such as the buttons. However, unlike traditional menus, when the pen cursor crosses the exterior edge or tracking boundary of the menu, the menu is moved to keep it under the cursor. A tracking menu, such as that of the present invention, can track other types of input devices such as a finger in a touch based menu, a traditional mouse and 3D input devices such as gloves. Additional details with respect to tracking menus can be found in the related application noted above.

Figure 2:
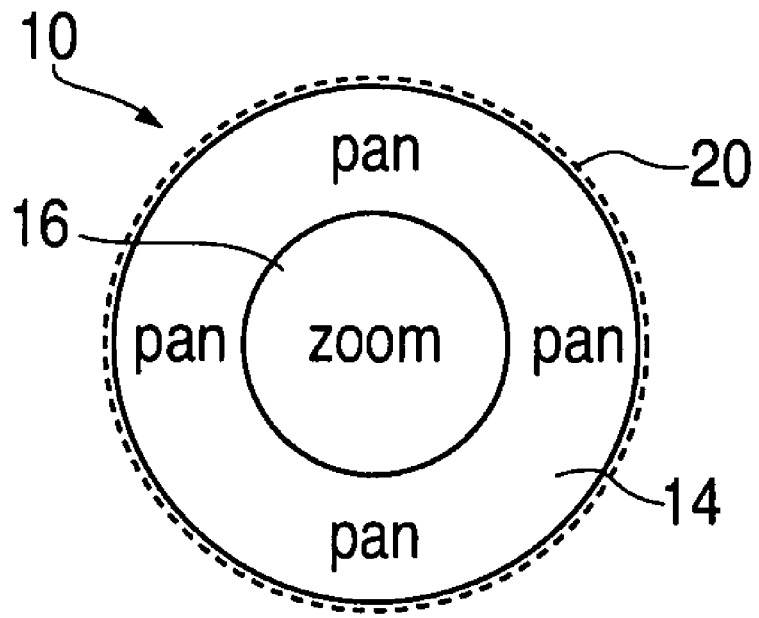
FIG. 2 depicts a second embodiment and a tracking boundary.

The pan-zoom tracking menu 10, as noted above, includes a tracking menu tracking boundary 20 depicted by a dashed line in FIG. 2. This boundary 20 allows the pen cursor 12 to move within the tracking menu 10 without causing the tool 10 to move with the movement of the pen. The boundary 20 is shown as coinciding with the visible edge of the exterior of the pan graphic 14 but need not be so coincident. FIG. 2 also shows another embodiment of the graphic for the tool 10 where the icons 18 and 19 have been replaced by words and in the case of FIG. 2 the pan region is highlighted.

Figure 3A:
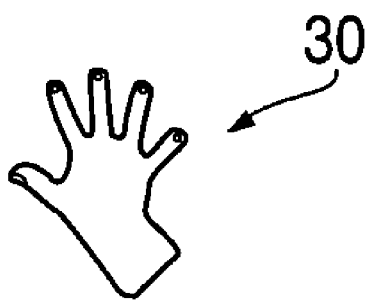
FIGS. 3a and 3b show pan and zoom icons.
Figure 3B:
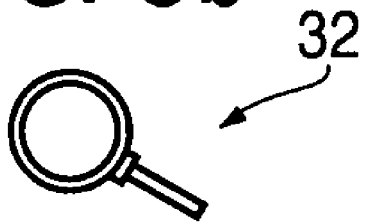

When the pan or zoom functions are activated, the tool 10 can be made to disappear or become completely invisible with or without a tracking symbol, such as an arrow (see 12), showing the position of the pen. As an alternative, the tool 10 can become invisible and the tracking symbol can be replaced by the appropriate pan icon 30 or zoom icon 32, as depicted in FIGS. 3a and 3b.

The operation of the pan-zoom tracking menu tool 10 of the present invention can be understood using a state diagram as depicted in FIG. 4. In state 0 the pen is out-of-range 40 of the tracking system of the tablet PC and the tracking menu 10 is visible (preferably semi-transparent) and is positioned in the last place it resided before the pen moved out-of-range or in an initial position if the tracking menu has just been involved. The state 0 is entered from states 1 and 1E when the pen is lifted from the tablet and moved out-of-range. The menu 10 resides in this last position until the pen is brought back into range and the tablet PC begins tracking the pen.

The pen can move into tracking range 42 and enter state 1 in two different ways. In the first into-range transition, the pen comes down at a position where the tip of the pen is outside of the tracking menu edge or tracking boundary 20. When tracking starts in this condition, the menu 10 is moved or repositioned 44 so that the cursor is inside the menu edge. This involves conventionally redrawing the semi-transparent menu 10 at a position corresponding to the pen tip, cursor or sensed pen transducer position. This repositioning or redrawing can place the menu 10 such that the menu 10 is moved the minimum distance to place the pen cursor just within the edge of the menu 10. Or the repositioning can place the menu at an arbitrary position under the cursor, such as positioning the menu with the pen tip in the center of the most used or last used control. The second into-range transition occurs when the pen tip comes into range when it is within the boundary 20 of the tracking menu 10.

In state 1 the pen cursor 12 moves freely about within the tool 10 and the menu 10 stays stationary. During this movement of the pen cursor within the menu 10, the system performs conventional operations, such as highlighting the pan (14) and zoom (16) controls over which the cursor passes by comparing the position of the cursor to positions of the controls. However, if the pen is lifted out-of-range the state moves to state 0 (the pen tracking becomes inactive), if the pen encounters an edge 20 as it moves, state 1E is entered and if the pen touches the tablet surface state 2 is entered.

To enter state 1E the position of the pen cursor (or pen tip transducer position) is conventionally compared to the position of the edges or boundary 20 of the pan-zoom tracking menu tool 10. When a match occurs, the cursor has hit the edge and the state 1E is entered. In state 1E, as long as the cursor is at or in contact with an edge of the menu as the cursor moves, the tracking menu (semi-transparent) is moved along with the cursor. That is, as the cursor is moved, the menu 10 is conventionally redrawn with the cursor at the edge of the tracking menu. In state 1E, if the pen is lifted out-of-range the state moves to state 0, if the pen moves away from an edge to reenter the interior of the menu the state moves to state 1 and if the pen touches the tablet, state 2 is entered.

As discussed above, state 2 is entered when the pen touches 46 (pen down) the tablet surface while in state 1 or state 1E. In this state the pen is active or activated such that it will cause some function to be performed. In state 2 the active pen can be selecting a control, in which case the function of the control is performed, such as switching to the pan function from the zoom function. Alternatively there could be a temporary state before making the pan-zoom tracking menu transparent and invoking the function. For example, pressing on zoom could momentarily flash the zoom button, then hide the menu and invoke the zooming function. As another example, performing an action associated with a menu item for zoom could include first flashing the item, then making the menu disappear and then finally tracking the cursor and adjusting the zoom level. Or the active pen can be moving while under the control of a previously selected function, such as zooming based on a previous selection of the zoom function. In state 2, the tracking menu 10 may be made fully transparent. In this state, the system can continue to reposition the fully transparent menu under the cursor 12 or preferably the menu can be allowed to remain in it's last position as in state 0 (note the user would not perceive a difference between these two alternatives). When the pen is lifted from the tablet surface and contact with the tablet ends, the tracking mode 42 is again entered and the menu 10 is repositioned 48 depending on the last state. If the pen is lifted when the prior state is state 1E, the pen is repositioned 48 at the last edge point of state 1E. If the pen is lifted when the prior state is state 1, the pen is repositioned 48 at the last interior point of state 1.

Additional details concerning tracking operations can be found in the related application previously noted.

Figure 5B:
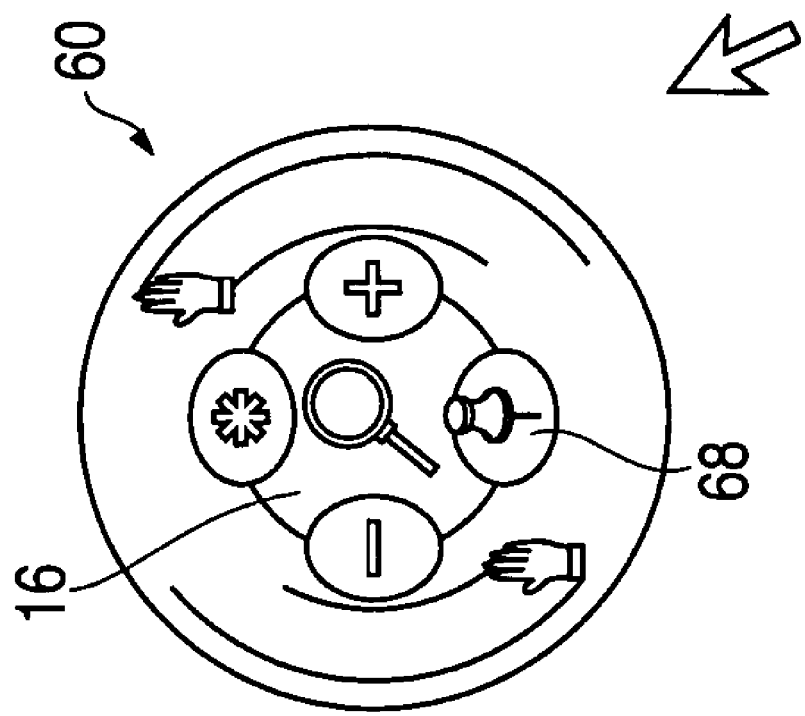
FIGS. 5a and 5b show an embodiment with additional control buttons including a pin control.
Figure 5A:
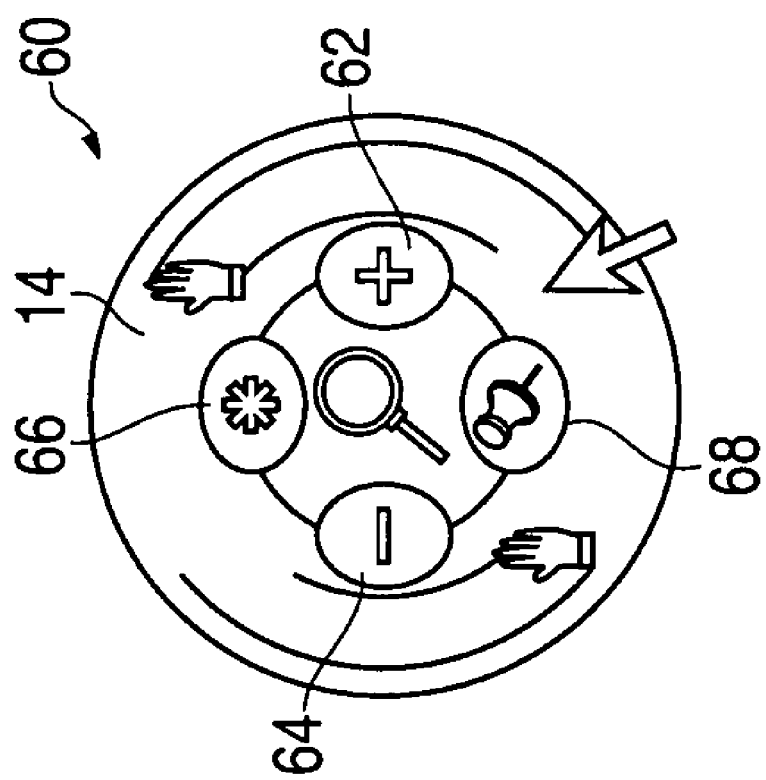

The pan zoom tool of the present invention can have other graphic and button/control arrangements as depicted in FIGS. 5a and 5b. The tool 60 can have discrete buttons in addition to the circular control regions 14 and 16. Discrete buttons, such as zoom-in 62 and zoom-out 64, can be provided to allow discrete steps in zooming. A pop-up menu button 66 can also be provided that displays a pop-up menu when clicked on.

The tool 50 can also be pinned to the display and enter a state where the tool does not move when the cursor encounters the edge or tracking boundary. A pin button or control 68 is shown not engaged in FIG. 4a and shown engaged in FIG. 4b. The pin function pins the tool to the canvas or display at the position where the pin function is engaged and allows the tracking symbol to pass over the tracking menu boundary so the pen/mouse can access items outside the pan-zoom tool. When the tool is in the pinned state and the tracking symbol crosses back inside the tracking boundary, the pin state is released. Additional details with respect to pinning in tracking menus can be found in the related application noted above.

Pinning and invocation of a function can also be performed in an alternate way. This alternate method is depicted in FIG. 6. FIG. 6 also depicts mode replacement that is described visually with respect to FIGS. 13-18.

While the digitizer tracking system of the pen based computer is tracking 80 the pen or a mouse, as depicted in FIG. 6, the system determines 82 whether the tool 10 is in the pinned state. If not, the system displays 84 the menu centered on the tracking symbol 12 so that the symbol is over the center function region and determines 86 whether the pen or mouse is in the down state (touching the tablet for the pen or a button down for a mouse). If in the down state, the menu 10 is pinned 88 to the display or canvas and the system determines 90 whether the pen or mouse is in the drag state (pen down for a pen or a button down for a mouse). If a drag is in progress, the system waits 92 for the symbol to exit the center region of the tool. When the center is exited the center mode of operation is performed 94, which in the case of the pan-zoom tool of FIG. 1 is the zoom via dragging operation. When the pen is raised up or the mouse button is released, the tool is re-centered 96 on the tracking symbol and the menu is pinned to the canvas.

When the tracking menu is pinned (82), the system determines 98 whether the tracking symbol is over the subcomponent or outer ring region. If so, the appearance of the tracking symbol can be changed 100. When the pen or mouse enters 102 the down state the subcomponent operation is performed, which in this case of the pan-zoom tool of FIG. 1 is the pan operation. During the operation the system determines whether the subcomponent is designated replaceable. When it is replaceable, upon pen or mouse up 108, the menu is re-centered, the tracking menu remains pinned and the tool replaces the center mode with the subcomponent mode (see FIGS. 13-18). When it is not replaceable (106), the menu is positioned 110 either at the same relative position with respect to the tracking symbol or centered on the tracking symbol and the menu remains pinned.

When the tracking symbol is not over the subcomponent (98), the system determines 112 whether the tracking symbol is beyond an unpin border region that allows the pinning to be revoked or cancelled. If so, the appearance of the tracking symbol can be changed 114 and the menu tool 10 is unpinned 116 and re-centered on the location of the pen or mouse.

Figure 7:
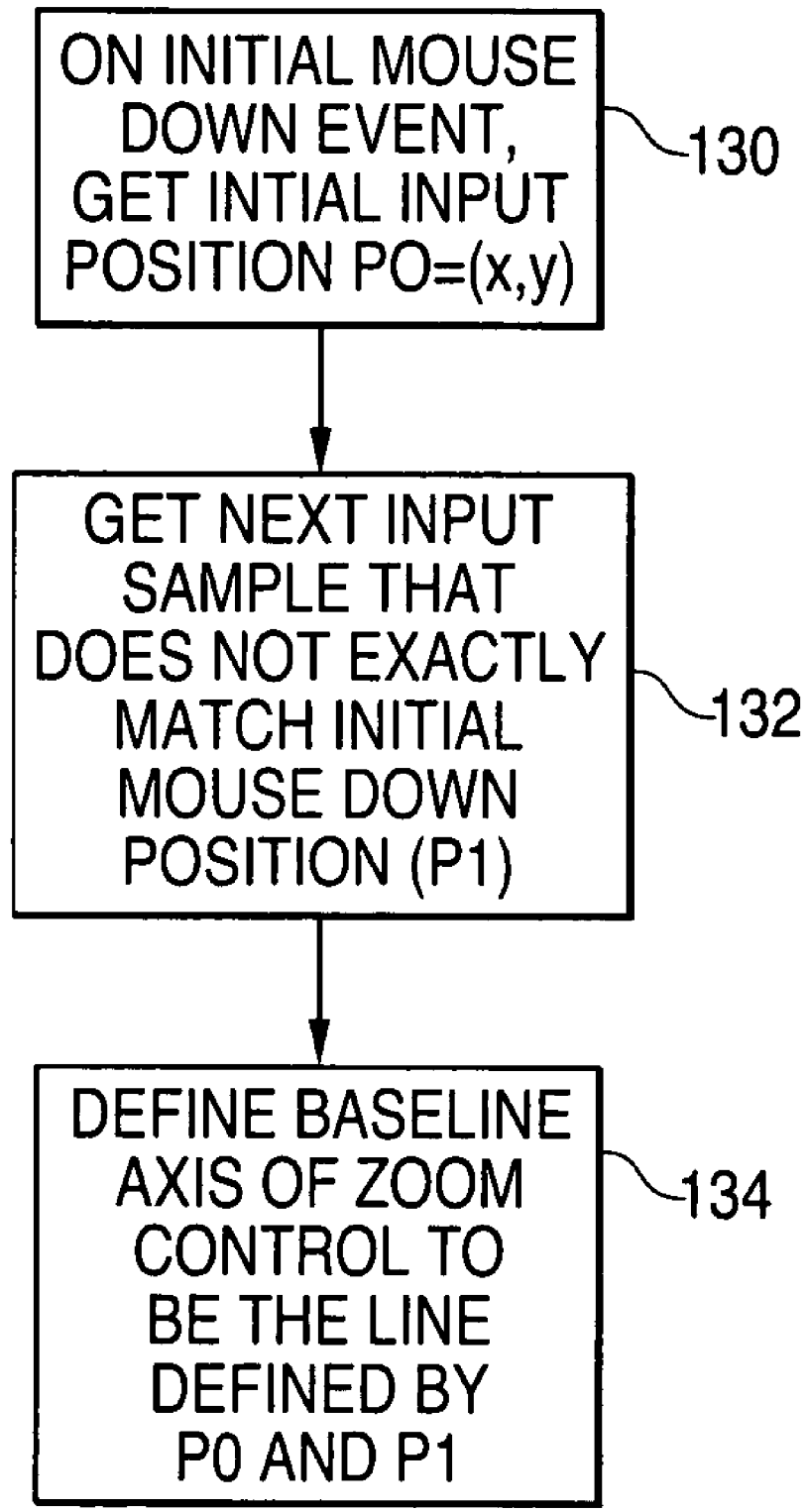
FIG. 7 depicts axis determination of user a designatable zoom control axis.

As discussed above, the present invention allows the user to select or designate a zoom control axis and then the zoom is controlled by pen movements essentially projected onto that axis. The first operation is to determine the axis and starts with sampling 130 (see FIG. 7) an initial position (P0) of a pen or mouse down event after the zoom function has been activated. The system then samples 132 the inputs from the position transducer and saves the first position input (P1) that is not the same as the initial sample. The zoom base line or control axis is set 134 as the line defined by these two points, P0-P1. Once the axis is defined, the zoom scale is determined based on movements of the pen or mouse.

Figure 8:
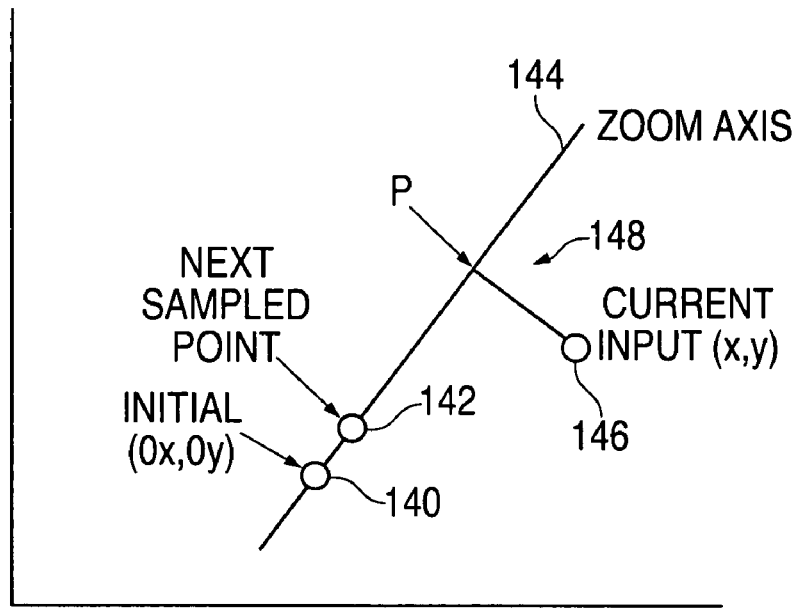
FIG. 8 illustrates the zoom axis and the projection of pen position onto the axis.

As depicted in FIG. 8, the initial 140 and second 142 samples define the zoom axis 144. As noted above, a current position 146 of a mouse or pen is projected onto the zoom axis 144 to define a current zoom position 148. This position 148 is used to determine the amount of zoom or scale factor where the scale factor is the variable by which the image is multiplied to obtain the zoomed (in or out) image.

Figure 9:
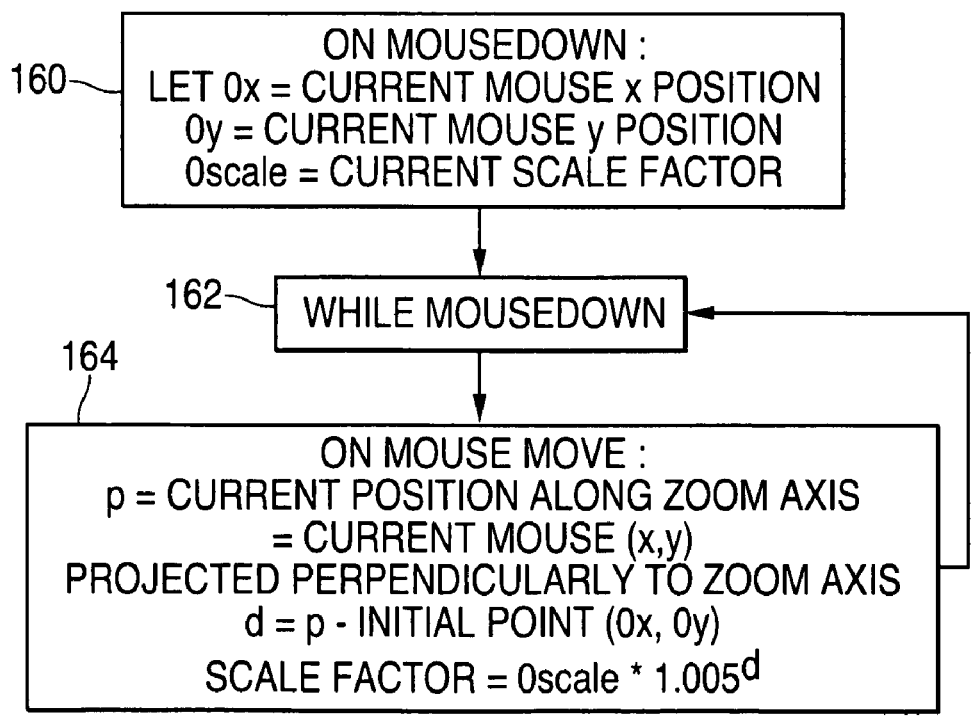
FIG. 9 shows scale operations using a user selectable zoom control axis.

When the down event occurs, the current position of the mouse/pen (position transducer) and the scale factor are set 160 to zero, as depicted in FIG. 9. While the mouse is down 162, the system determines 164 the current axis position p, as previously discussed, by projecting the current transducer position to the zoom axis. This determination 164 also determines the distance along the axis as d=p−P0. The distance d is used to calculate the scale factor (sf) as sf=0scale*1.005**d where 0scale is the current scale factor for the image (for example, 110%, 52%, etc.). The scale factor is conventionally used to change the size of the displayed image.

Figure 10:
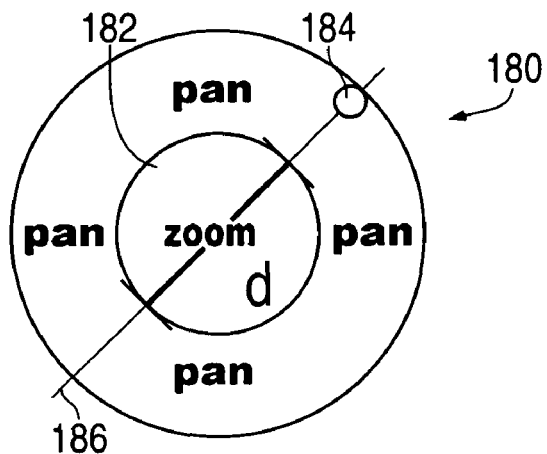
FIG. 10 shows control zone size relationships.
Figure 11A:
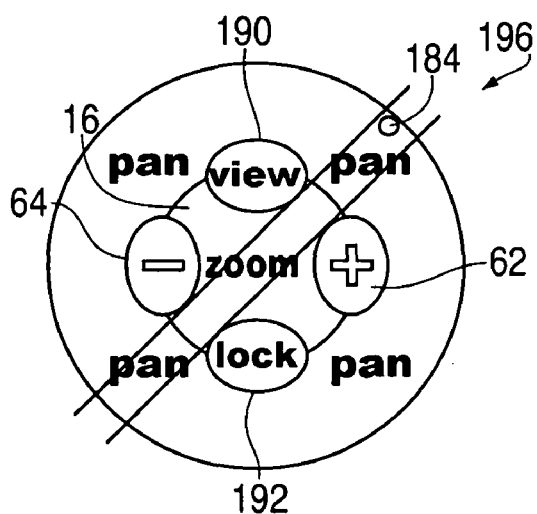
FIGS. 11a and 11b depict access channels.
Figure 11B:
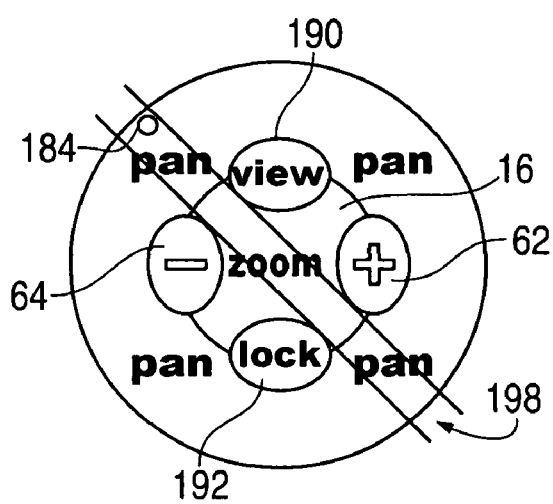

As depicted in FIGS. 5a and 5b, the tool of the present invention can have buttons or controls in addition to the zoom 14 and pan 14 controls. The placement of the additional controls, and the design of the tool, needs to preserve as much of the widget or control width as possible to allow the user to easily hit the control when moving to the control to activate the control. This width distance within the tool 180 for the zoom control 182 is depicted in FIG. 10. This figure assumes that the user has just "jumped" to the top-right of the display and the dot 184 indicates the input transducer location, the edge of the pan-zoom tool 180. With an assumed typical motion path 186, the additional buttons or controls 62, 64, 190 and 192 are preferably placed in locations as depicted in FIGS. 11a and 11b to create interactions channels 196 and 198 for top-right and bottom left operations, respectively. After a "jump" in the "up and right" direction, the user has interaction corridor 196 preserving the length of the "zoom" subcomponent and the inner bubble buttons ("view", "+", "lock" and "−") minimally interfere with the targeting of the zoom control 16. Same principle holds true for top-left and bottom-right operation and channel 198. This design is also handedness-independent.

FIGS. 11a and 11b also depict a button 192 for a lock function. A lock function is like the pin function discussed previously in that the tool is pinned to the display except that the lock button must be activated for both locking and unlocking; the tracking symbol crossing back inside the tracking menu boundary does not unlock the tool. Additional information can be obtained concerning pinning and locking of tracking menus from the related application noted above.

These FIGS. 11a and 11b also illustrate a "view" button 190 that can be used to control the size of the image. This button 190, when activated, invokes a marking menu 210 (see FIG. 12) with overflow items in an associated linear menu 212.

FIGS. 13-18 depict an alternate design for the pan-zoom tool 230. This version of the pan-zoom tool 230 allows for multiple modes to be "locked-in" as the default action while providing multiple one-shot actions and modalities selectable thru the use of a radial layout of control zones 232-240.

Figure 13:
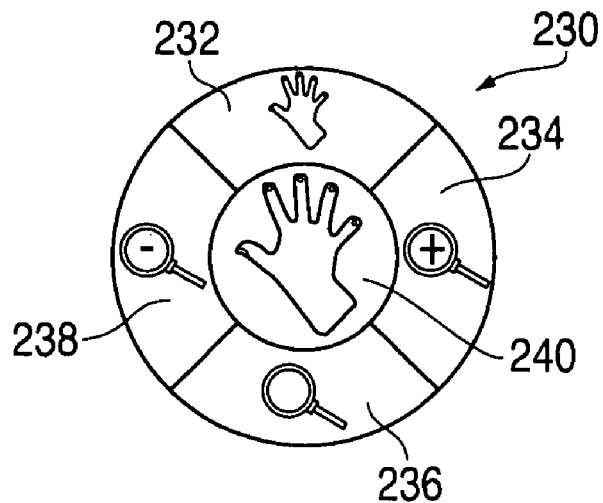
FIGS. 13-18 depict central zone function replacement.
Figure 14:
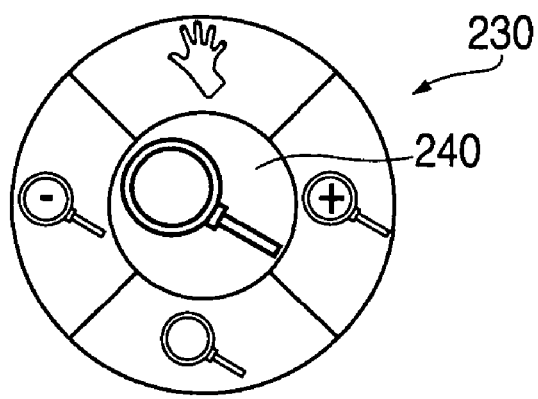
Figure 15:
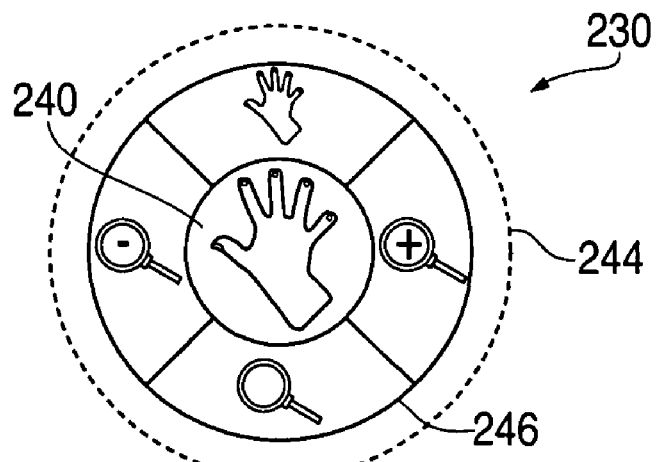
Figure 16:
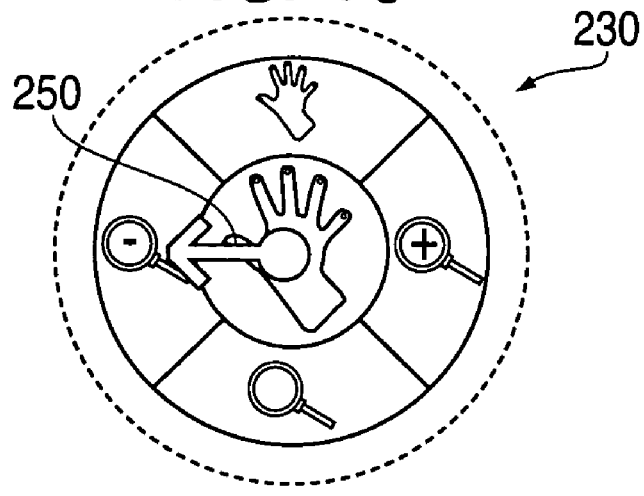
Figure 17:
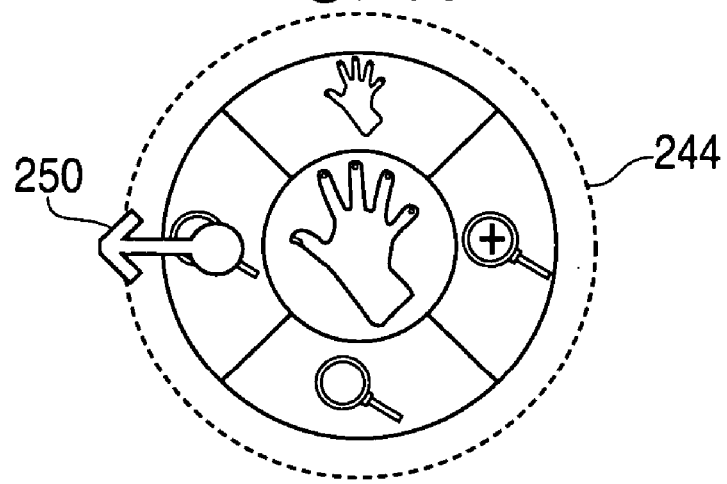
Figure 18:
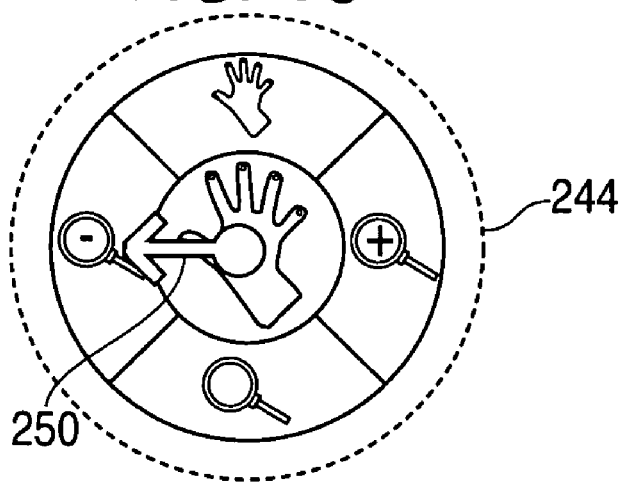

Modes can be temporary (lasting the duration of the mouse/pen drag event) or modes can be designated as "replaceable" as discussed above in the discussion of FIG. 6 where a newly activated mode replaces the default, center mode. In this design the input transducer or tracking symbol is always centered on the inner/center mode or region. To change modes or do a one-shot action, the user "taps" the pen to the screen to pin the menu, then performs a "small hop" in the designated direction (e.g., north, east, south, west) to select a different tool (and this also assigns that tool to the center region to be default action). Performing a "larger hop" will engage the default mode and reposition (i.e., center) the menu. FIG. 13 shows pan-zoom tracking menu widget with pan as default action in the center region or zone 240 (see large hand pan icon). The "+" magnifier glass in zone 234 is a one-shot button to incrementally zoom in one level. Similarly the "−" magnifier glass in zone 238 zooms out one level. The magnifier lens icon in zone 236 is a second mode where dragging left will zoom in while dragging right will zoom out. FIG. 14 depicts the tool 230 with zoom (magnifier lens icon in center zone 240) as the default action. The south item mode (the zoom tool in zone 236) has replaced the center tool. As depicted in FIG. 15, the invisible tracking border or boundary 244 around tool 230 is larger than the graphic 246 for the tool 230 (and could be much larger than the graphic 246). If the input transducer goes beyond this border 244, the tool (zone 240) is re-centered under the current location of the input transducer and is constantly re-centered while the input transducer is in the tracking state. On a mouse-down event, as depicted in FIG. 16, the center zone mode is engaged. In this case panning occurs during the drag event (after dragging beyond some very small dead zone in the center) as the tracking symbol is moved. This dead zone allows the user to "tap" the pen in center without triggering the center mode and pin the menu. As depicted in FIG. 17, if the tool 230 is currently pinned, the user can move the tracking symbol 250 freely around in the tool 230 and up to the invisible border 244. Crossing this border 244 unpins the tool. If the tool 230 is not currently pinned, the user must land the tool 230 by initiating a pen/mouse down event. FIGS. 17 and 18 depict moving the tracking symbol 250 beyond the invisible "unpin" border 244 with a "snap" of the tool to be centered under the input transducer or symbol 250.

Figure 19:
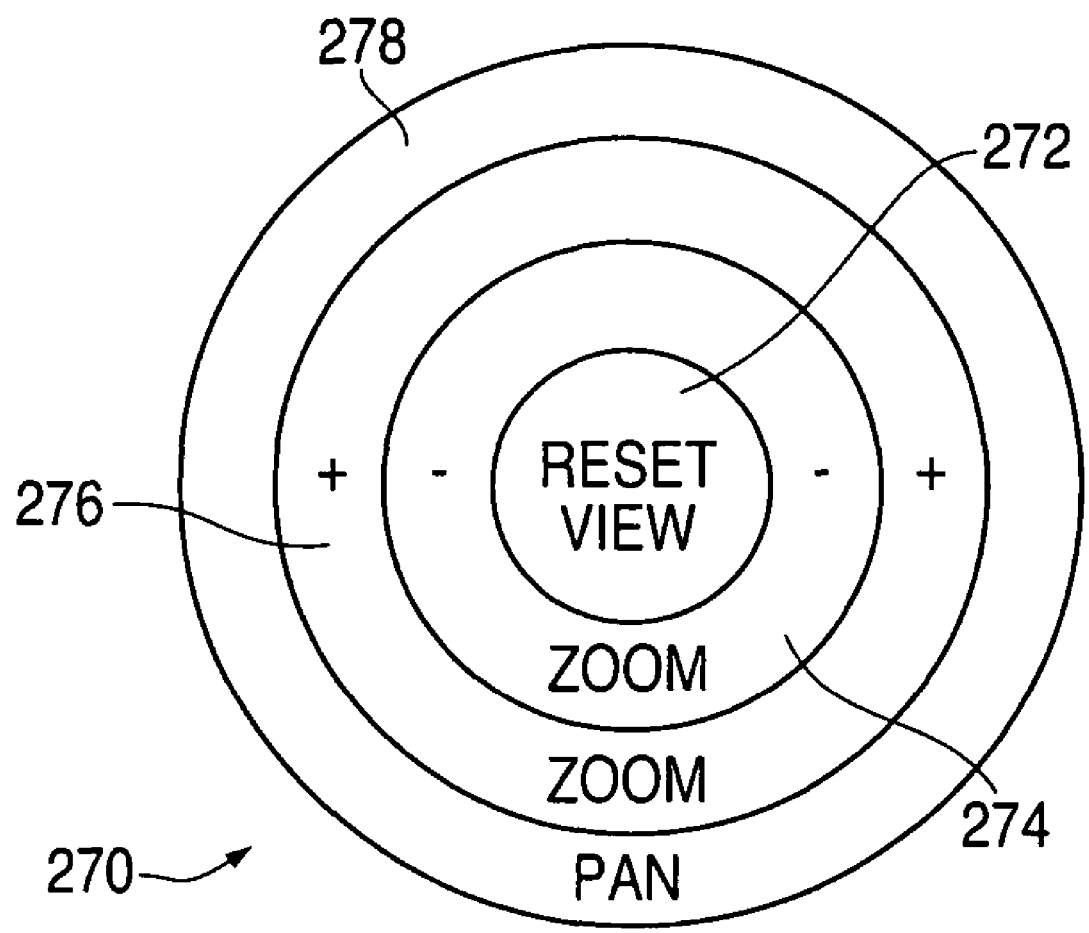
FIG. 19 depicts a ring control embodiment.
Figure 20:
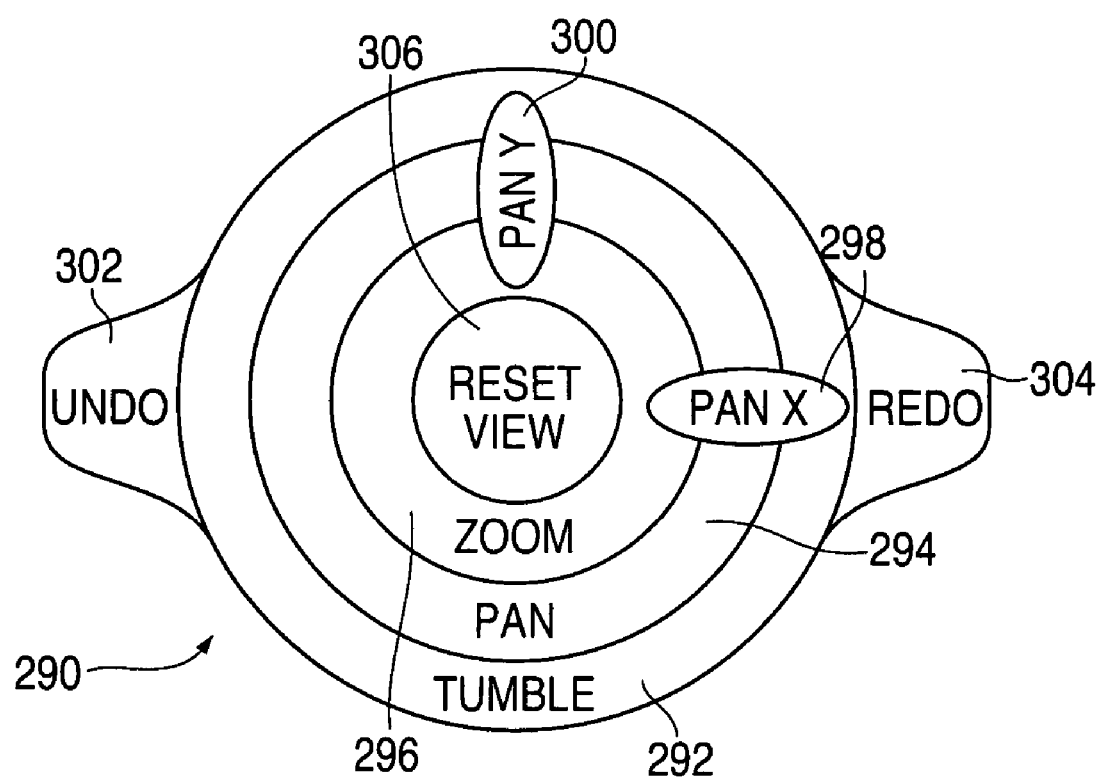
FIG. 20 illustrates an embodiment with tumbling and other controls.

As previously mentioned, the pan zoom tool can include different control layouts for additional functions beyond zoom and pan. FIG. 19 illustrates a concentric ring layout for a tool 270 where the center control 272 resets the view, the first ring 274 is a zoom-out control that zooms by a predetermined step, the second ring 276 is zoom-in by a predetermined step and the outside ring 278 is the pan control. FIG. 20 shows a pan-zoom tracking menu 290 where the most frequently used camera control for 3D images, tumbling, is given priority in the design by being placed in the large outer region 292. Additional, less frequently used commands pan 294 and zoom 296 are placed appropriately in smaller regions thus reducing the chance of accidental engagement. This tool 290 also shows buttons 298 and 300 for limiting the pan to one of the display axes as well as buttons for conventional undo 302, redo 304 and view reset 306 functions. These tool controls 302-306 can have permeable zones where the user must dwell over the region border with the tracking symbol or cursor and after some time (preferably approximately half a second) the cursor may enter and activate the zone. This provides a way of offering functionality within the tracking menu but at a reduced level of accessibility.

Figure 21:
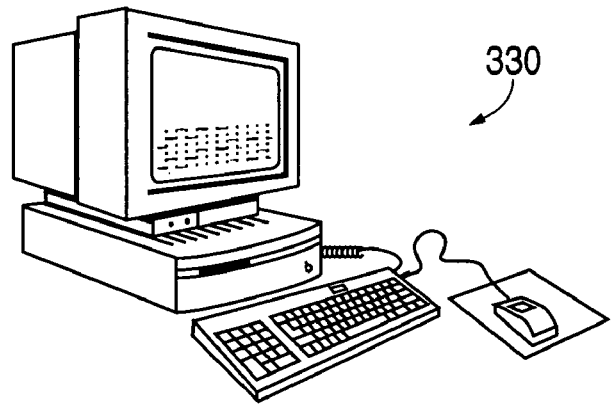
FIG. 21 shows a desktop PC as hardware of the present invention.
Figure 22:
FIG. 22 depicts a tablet PC as hardware of the present invention.
Figure 23:
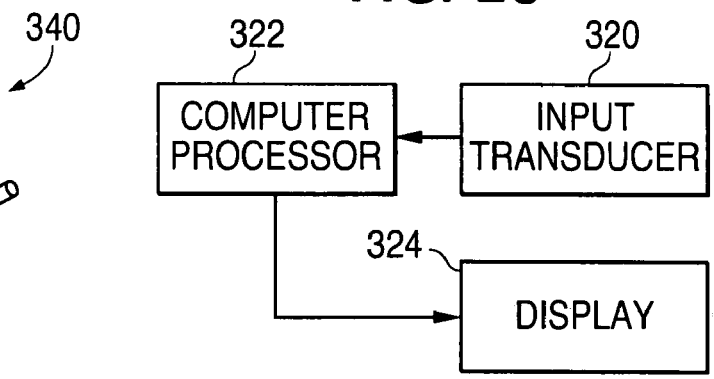
FIG. 23 shows components of the hardware of the present invention

The hardware of the pan-zoom tracking menu system can be within a desktop PC 330 (see FIG. 21) or within a handheld device, such as a tablet PC 340 (see FIG. 22) or a PDA, and includes an input transducer 320 the position of which is tracked by a computer 322 that processes the transducer positions and creates the tracking menu display that is presented on a display 324 as shown in FIG. 23.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The present invention has been described with respect to invoked and dismissed the pan-zoom tool in the same manner as a traditional modal tool by clicking on a tool palette or menu item. It is also possible to trigger or invoke the tool by pressing an activation key: like spacebar on a keyboard or pressing the barrel button on the pen, or a button on the bezel of the tablet PC. This triggering can be combined with a toggle function where press of the activation key displays the tool another dismisses it or, more preferred, where the tool is displayed while the space bar is kept pressed. The invention has been described with all the rings being visible or invisible together. Alternatively only one of the rings can be made invisible. Preferably this involves making the outer rings invisible (for example, only the zoom is shown but the cursor turns into a pan hand when it is over the outer, invisible ring).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A graphical user interface display, comprising:

a first region control initiating a first function when activated;

a second region control associated with the first region control, the second region control having an outer edge and initiating a second function;

a tracking menu boundary surrounding the first and second region controls and coincident with the outer edge and the tracking menu boundary surrounding a menu and the first and second region controls which are always visible when one of the first and second region controls is not activated and always not visible when one of the first and second region controls is activated when a position transducer is in a down state over one of the first and second region controls; and a tracking symbol tracking a position of the position transducer moved by a user when the position transducer is in a tracking state, movable within the first and second region controls, initiating movement of the interface to track the tracking symbol when the tracking menu boundary is encountered by the tracking symbol during movement of the tracking symbol and the position transducer is in the tracking state and indicating event focus for activating and performing the first and second functions when the position transducer is in a down state over one of the first and second region controls.

2. A graphical user interface display as recited in claim 1, wherein the second region control surrounds the first region control.

3. A graphical user interface display as recited in claim 2, wherein the first region control is circular in shape.

4. A graphical user interface display as recited in claim 1, wherein the second region control is a most frequently used function.

5. A graphical user interface display as recited in claim 1, wherein the first function is a zoom function and the second function is a pan function.

6. A graphical user interface display as recited in claim 1, wherein the graphical user interface display is semi transparent when the functions are not activated, transparent when the functions are activated and one of a zoom and a pan icon replaces the tracking symbol when the functions are activated.

7. A graphical user interface display as recited in claim 1, wherein the first region control is circular shaped and the second region control is ring shaped.

8. A graphical user interface display as recited in claim 7, wherein the second region control is made invisible during movement and an icon for the second region control is displayed when the tracking symbol is over the second region control.

9. A graphical user interface display as recited in claim 7, wherein the second region control is segmented into ring segments each being a different control.

10. A graphical user interface display as recited in claim 7, further comprising a ring control having a ring shape surrounding the second control region and initiating a third function when activated.

11. A graphical user interface display as recited in claim 10, further comprising a button control initiating a third function when activated and located on a boundary between the first and second region controls.

12. A graphical user interface display as recited in claim 10, further comprising a button control initiating a third function when activated and located within a region.

13. A graphical user interface display as recited in claim 1, wherein the graphical user interface display is transparent when the one of the functions are activated and semitransparent when the functions are not activated.

14. A graphical user interface display as recited in claim 1, further comprising a button control initiating a third function when activated and located on a boundary between the first and second region controls.

15. A graphical user interface display as recited in claim 1, further comprising button controls initiating a function when activated and located on a boundary between the first and second region controls and creating access channels for movement of the tracking symbol within the interface.

16. A graphical user interface display as recited in claim 1, wherein the second region control has an exterior graphic edge and the tracking boundary coincides with the exterior graphic edge.

17. A graphical user interface display as recited in claim 1, wherein the interface is invoked by pressing an activation key.

18. A graphical user interface display as recited in claim 1, wherein the interface is displayed while an activation key is active.

19. A graphical user interface display, comprising:
 a circular shaped first region control initiating a zoom function when activated;
 a ring shaped second region control surrounding the circular shaped first control region control and initiating a pan function when activated;
 a ring control having a ring shape surrounding the ring shaped second control region having an outer edge and initiating a third function when activated, the third function being a most frequently used function;
 button controls initiating additional functions when activated, located on a boundary between the first and second region controls and creating access channels for movement of a tracking symbol within the graphical user interface display;
 a tracking menu boundary surrounding the ring control and coincident with the outer edge and the tracking menu boundary surrounding a menu and the controls which are always visible when one of the controls is not activated and always not visible when one of the controls is activated when the tracking symbol is in a down state over one of the controls,
 wherein the graphical user interface is semi transparent when any of the functions are not activated, transparent when any of the functions are activated when the tracking symbol is in the down state and a function icon replaces the tracking symbol when the functions are activated,
 wherein the ring shaped second region control is made invisible during movement and an icon for the ring shaped second region control is displayed when the tracking symbol is over the ring shaped second region control, and
 wherein the ring shaped second region control has an exterior graphic edge and the tracking boundary coincides with the exterior graphic edge.

20. A user interface display, comprising:
 a movable control having a first function activatable in an entire peripheral region of the control and a second function activatable in a central region of the movable control having an exterior edge; and
 a tracking symbol movable within the control in a tracking state and moving the control when the tracking symbol is in the tracking state and the exterior edge of the peripheral region is encountered and the control is always visible when one of the functions is not activated and always not visible when one of the functions is activated when the tracking symbol is in a down state over the central region of the movable control or entire peripheral region of the movable control.

21. A user interface display, comprising:
 a tracking menu having a first function activatable in an entire peripheral region of the tracking menu and the tracking menu having an exterior edge, a second function activatable in a central region of the tracking menu and a tracking symbol tracking a position of a user positionable input transducer when in a tracking state and causing the tracking menu to move when the exterior edge is encountered and when the user positionable input transducer is in the tracking state and the tracking menu is always visible when one of the functions is not activated and always not visible when one of the functions is activated when the user positionable input transducer is in a down state over the entire peripheral region of the tracking menu or the central region of the tracking menu.

22. A method, comprising:
 displaying a pan-zoom tracking menu tool having an exterior edge;
 allowing a user to select pan and zoom operations using the pan-zoom tracking menu tool and an input transducer;
 performing a selected one of the pan and zoom operations responsive to movements of the input transducer by the user and causing the menu to move when the exterior edge is encountered when the input transducer is in a tracking state;

presenting the menu as always visible when one of the operations is not activated and always not visible when one of the operations is activated and the input transducer is in a down state.

23. A method as recited in claim 22, displaying a corresponding pan and zoom tracking symbol icon as a replacement for the tool during the performing.

24. A method as recited in claim 23, wherein replacement occurs when the tool is pinned.

25. A method as recited in claim 22, further comprising designating a zoom control axis responsive to initial movement of the input transducer after the zoom operation is selected.

26. A method as recited in claim 25, further comprising controlling a zoom scale factor responsive to a projection of transducer movements onto the control axis.

27. A method as recited in claim 22, wherein the tool includes a replaceable control and said method further comprises designating the replaceable control as the most recently selected pan and zoom operation.

28. A method as recited in claim 22, wherein the tool can be pinned and the tool is unpinned when the transducer moves beyond an unpin border.

29. An apparatus, comprising:
a display;
a pen type input transducer; and
a computer coupled to the display and the pen type input transducer and providing a pan-zoom tracking menu on the display and allowing a user to select and perform pan and zoom operations using the transducer input when the pen type input transducer is in a down state and moving the menu when an outer edge of the menu is encountered when the pen type input transducer is in a tracking state, and displaying the menu as always visible when one of the operations is not activated and always not visible when one of the operations is activated when the pen type input transducer is in the down state.

30. A computer readable storage controlling a computer via a pan-zoom tracking menu having the appearance of a center and a surrounding ring and interpreting transducer input events as pan and zoom selection and control events and interpreting transducer motion as a menu move event when an outer edge of the menu is encountered when in a transducer tracking state, and the menu is always visible when one of the control events indicates pan or zoom is not activated and always not visible when one of the control events indicates pan or zoom is activated when in a transducer down state.

31. A computer readable storage controlling a computer by producing a graphical user interface on a display that has an appearance of a center and a surrounding ring graphic, moving the graphic on the display as a tracking menu responsive to movement of a pen when an outer edge of the surrounding ring graphic is encountered and the pen is in a tracking state, interpreting input events initiated by the pen as pan and zoom selection and control events, and the graphical user interface is always visible when one of the control events indicates pan or zoom is not activated and always not visible when one of the control events indicates pan or zoom is activated and when the pen is in a down state.

32. A graphical user interface display, comprising:
a pan-zoom tracking menu having a zoom control in a center and a pan control surrounding the zoom control and with the tracking menu moving when an area immediately outside the menu is about to be reached when in a tracking state and the menu is always visible when one of the controls is not activated and always not visible when one of the controls is activated when in a down state.

33. A graphical user interface display displaying an interface, comprising:
a first region control initiating a first function when activated;
a second region control associated with the first region control having an outer edge and initiating a second function;
a tracking menu boundary surrounding the first and second region controls and coincident with the outer edge; and
a tracking symbol tracking a position of a position transducer moved by a user, movable within the first and second region controls when the position transducer is in a tracking state, initiating movement of the interface to track the tracking symbol when the boundary is encountered by the tracking symbol during movement of the tracking symbol and the position transducer is in the tracking state and indicating event focus for activating and performing the first and second functions when the position transducer is in a down state.

34. A graphical user interface display as recited in claim 1, wherein said initiating movement of the interface to track the tracking symbol occurs when the menu and controls are not visible when the position transducer is in the down state.

* * * * *

UNITED STATES PATENT AND TRADEMARK OFFICE
CERTIFICATE OF CORRECTION

| | | |
|---|---|---|
| PATENT NO. | : 7,814,439 B2 | Page 1 of 1 |
| APPLICATION NO. | : 10/684579 | |
| DATED | : October 12, 2010 | |
| INVENTOR(S) | : George W. Fitzmaurice et al. | |

It is certified that error appears in the above-identified patent and that said Letters Patent is hereby corrected as shown below:

Sheet 1 of 14 (Fig. 1a), Line 3 (Replacement Sheet), delete "20" and insert --19--, therefor.

Column 2, Line 21 after "pinning" insert --.--.

Column 2, Line 41 after "invention" insert --.--.

Column 4, Line 66 delete "state 1 ," and insert --state 1,--, therefor.

Column 9, Line 64 in Claim 19, delete "first control region" and insert --first region--, therefor.

Signed and Sealed this

Fourth Day of January, 2011

David J. Kappos
*Director of the United States Patent and Trademark Office*